United States Patent
Gronemann et al.

(10) Patent No.: US 6,506,993 B1
(45) Date of Patent: Jan. 14, 2003

(54) DRIVE DEVICE FOR A SWITCHING DEVICE FOR MEDIUM-VOLTAGE SWITCHGEAR ASSEMBLIES

(75) Inventors: Karl-Heinz Gronemann, Heusenstamm (DE); Joachim Kaletta, Berlin (DE); Rainer Stolz, Maintal (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/914,159
(22) PCT Filed: Feb. 22, 2000
(86) PCT No.: PCT/DE00/00558
§ 371 (c)(1),
(2), (4) Date: Aug. 24, 2001
(87) PCT Pub. No.: WO00/51150
PCT Pub. Date: Aug. 31, 2000

(30) Foreign Application Priority Data

Feb. 24, 1999 (DE) ............................ 299 04 223 U

(51) Int. Cl.$^7$ ............................................ H01H 3/32
(52) U.S. Cl. ................................. 218/154; 218/140
(58) Field of Search ..................... 218/153, 154, 218/118–120, 140, 7, 8, 14, 78, 84, 55, 123

(56) References Cited

U.S. PATENT DOCUMENTS

| 3,801,768 A | 4/1974 | Meyer | |
| 4,555,603 A | 11/1985 | Aoyama | |
| 5,382,765 A | 1/1995 | Lorenz et al. | |
| 5,981,894 A | * 11/1999 | Kammerl et al. | ............ 218/123 |
| 6,205,018 B1 | * 3/2001 | Arnborg | .................. 200/332.1 |

FOREIGN PATENT DOCUMENTS

| DE | 41 25 897 C2 | 7/1992 | |
| DE | 42 10 695 C1 | 7/1993 | |
| GB | 2252672 A | * 8/1992 | ............ H01H/3/32 |

* cited by examiner

Primary Examiner—Lincoln Donovan
Assistant Examiner—M. Fishman
(74) Attorney, Agent, or Firm—Morrison & Foerster, LLP

(57) ABSTRACT

A device for a switching device, in particular for grounding switches for medium-voltage voltage switchgear assemblies, has a grounding device shaft in a stationary switch panel, which grounding device shaft can be operated manually, is connected by means of a drive mechanism, which transmits radial movement, to a drive coupling, which accommodates the radial movements, of the switch panel, and can be moved to the coupled state only in a permissible manner by means of a module shaft which is mounted in a movable switching module such that it can rotate. The locked state is indicated by the axial movement of the module shaft beyond the contour of the switching module. In order to operate the disconnector contact when it is coupled, the switching module is locked to the switch panel by the disconnector shaft.

5 Claims, 1 Drawing Sheet

//!PAGE_START 1

DRIVE DEVICE FOR A SWITCHING DEVICE FOR MEDIUM-VOLTAGE SWITCHGEAR ASSEMBLIES

This application claims priority to International Application No. PCT/DE00/00558 which was published in the German language on Aug. 31, 2000.

TECHNICAL FIELD OF THE INVENTION

The invention relates to a drive device for a switching device, and in particular, to a drive device for grounding switches for medium-voltage switchgear assemblies.

BACKGROUND OF THE INVENTION

A drive device for a switching device is disclosed in DE 41 25 897 C2. Here, the operating shaft is connected via a coupling device to the main shaft of the switch disconnector, in which case the manually controllable operating shaft can be moved to the grounding position using an external operating apparatus to pivot it radially, via a connecting rod. However, for safety reasons, the grounding position of the switch disconnector can in principle be selected only when the switch disconnector is in the switched-off state.

The operating shaft, the main shaft and the connecting rod of the external operating apparatus are provided as stationary, compact operating mechanisms for a switch disconnector within the switch panel, and have a fixed connection to the corresponding drive devices.

DE 42 10 695 C1 discloses a switch drive, in particular for medium-voltage switching devices, in which the rotational movement of the operating shaft is transmitted to an operating shaft which is offset through 90°, via a sliding cam element.

The rotary movement of the operating shaft is produced by means of a bolt. which is predetermined by the configuration of the sliding cam element. This switch drive is also an integral component of the switching device within the switch panel.

SUMMARY OF THE INVENTION

In one embodiment of the invention, there is a drive device for a switching device. The invention includes, for example, an operating shaft in the form of a grounding device shaft in a stationary switch panel, the grounding device shaft is connected by a drive mechanism, which transmits radial movements, to a drive coupling, which accommodates the radial movements, of the switch panel; and a main shaft in the form of a module shaft which is mounted in a movable switching module such that it can rotate, with the longitudinal axes of the drive coupling and of the module shaft running such that they are superimposed, and wherein at a free end pointing toward the switch panel, the module shaft has a drive pin, which is arranged transversely with respect to its longitudinal axis, for engaging in the drive coupling, the switching module having a disconnector shaft, which is controlled such that it can rotate, for the disconnector and cover drive, the disconnector shaft provided in the free end region pointing toward the switch panel with an interlock pin which is arranged transversely with respect to its longitudinal axis and, when the drive pin on the module shaft is coupled to the drive coupling of the switch panel, engages in an interlock slot in the switch panel in order to lock the switching module to the switch panel.

In one aspect of the invention, a driver groove positioned in the drive coupling in such a manner that the drive pin on the module shaft can be engaged with the driver groove in a permissible coupling state, in a free end region facing away from the switch panel, the module shaft is provided with a pin indication which, when not in the correctly coupled state, can be moved axially against the force of a compression spring beyond the boundary contour of the switching module.

In another aspect of the invention, in the engagement region with the drive coupling, the module shaft is provided with a first centering chamfer, and in the engagement region with the module shaft, the drive coupling is equipped with a further centering chamfer.

In yet another aspect of the invention, the device is for grounding switches for medium voltage switchgear assemblies, having a drive device for a switching device, in particular for grounding switches for medium-voltage switchgear assemblies, having a main shaft of a switch disconnector and having an operating shaft, which can be connected via a coupling device, of a grounding switch, in which case the operating shaft can be operated manually, and the longitudinal axes of the main shaft and of the operating shaft run parallel to one another.

BRIEF DESCRIPTION OF THE DRAWINGS

The invention will now be explained in more detail by means of an exemplary embodiment which is illustrated in three figures, in which.

DETAILED DESCRIPTION OF THE PREFERRED EMBODIMENTS

Figure 1:
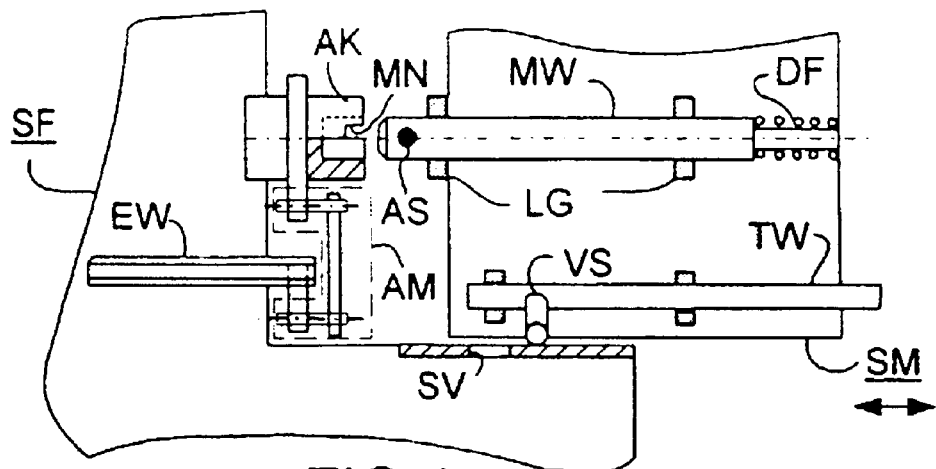
FIG. 1 shows the drive device in the uncoupled state.

The invention relates to a drive device for a switching device, and in particular, to a drive device for grounding switches for medium-voltage switchgear assemblies., having a main shaft of a switch disconnector and having an operating shaft, which can be connected via a coupling device, of a grounding switch, in which case the operating shaft can be operated manually, and the longitudinal axes of the main shaft and of the operating shaft run parallel to one another.

The invention defines switching processes in conjunction with the switch disconnectors in the operating sequence for switching devices such that the control system can also be used in switchgear assemblies having a modular structure. The safety requirements necessary with this technology should be fully ensured with regard to the interlocks and fault indications.

The invention is based on fixed-position drives which can be replaced by drives which are not in a fixed position, and the moving part of the drive can be physically entirely separated from the actual switching device within the switching device. This means that those components which are associated in the stationary switch panel, such as the isolating and grounding switches, can be controlled by a drive which is arranged in the movable switch module. There is accordingly less complexity in the switch panels, since the permissible and impermissible switching sequences is achieved in a simple manner by means of the configuration of the drive coupling according to the invention.

The normal operating state in the switch panels is provided by the grounding switch. The grounding switch is provided in the switch panel and operated when the position of the grounding device shaft in the switch panel matches the position of the module shaft in the switching module. In any contrary positions, for example with the grounding device shaft in the switched-on state and the module shaft in the switched-off state, or vice versa, critical operating states occur since in the first case—when the module shaft is in the switched-off state—the switch disconnector and in the second case—with the grounding device shaft in the switched-off state—the grounding switch must not be operated.

Subject to the stipulation that the grounding switch can be operated when the switching module is inserted and the switching module can be moved out of the switch panel when the grounding switch is in the switched-on and switched-off state, the required conditions are satisfied in a simple manner, when the module shaft is correctly coupled to the drive coupling, with the mutually dependent spatial association between the drive pin on the module shaft with respect to the engagement in the drive coupling of the grounding device shaft, and the interlock capability of the switching module with the switch panel.

Thus, as soon as the drive pin on the module shaft cannot engage in the driver groove in the drive coupling, the grounding device shaft is moved beyond the contour of the switching module, with the pin indication being displaced. With the pin indication extended, this provides a visual indication of this state in which the drive pin is not engaged with the driver groove in the drive coupling.

The centering chamfer both on the module shaft of the switching module and on the drive coupling of the switching panel mean that the two components are fed in reliably even if there is a minor offset, so that no damage whatsoever can occur on the drive coupling or the module shaft, or on both.

FIG. 1 shows a part of the switch panel SF with the grounding device shaft EW. The grounding device shaft EW is coupled to a drive mechanism AM, via which a rotary movement of the drive coupling AK can be transmitted. Furthermore, it can be seen that the drive coupling AK is equipped with a driver groove MN, into which the drive pin AS on a module shaft MN of the switching module SM engages in the coupled state. Furthermore it can be seen that the module shaft MW is mounted in bearings LG in the switching module SM such that it can rotate and, when coupled in a force-fitting manner to the grounding device shaft EW, is held in the region of the drive pin AS by the drive coupling AK. The drive pin AS, which is arranged transversely with respect to the longitudinal axis (which is not shown) of the module shaft MW transmits the rotary movement of the module shaft MW via the drive coupling AK and the drive mechanism AM directly to the grounding device shaft EW in the circuit diagram SF.

Furthermore, the switching module SM includes the disconnector shaft TW, which, in the end region facing the switch panel SF, contains an interlock pin VS, which is provided transversely with respect to its longitudinal axis. When the switching module SM is in this position, the interlock pin VS cannot be introduced into the interlock slot VS in the switch panel SF, that is to say the drive for the disconnector shaft TW is inhibited.

The double arrow, which is not shown, also indicates that the switching module SM can be moved in the arrow directions.

The module shaft MW can be moved axially within the switching module SM to a defined switch position, by means of the compression spring DF.

Figure 2:
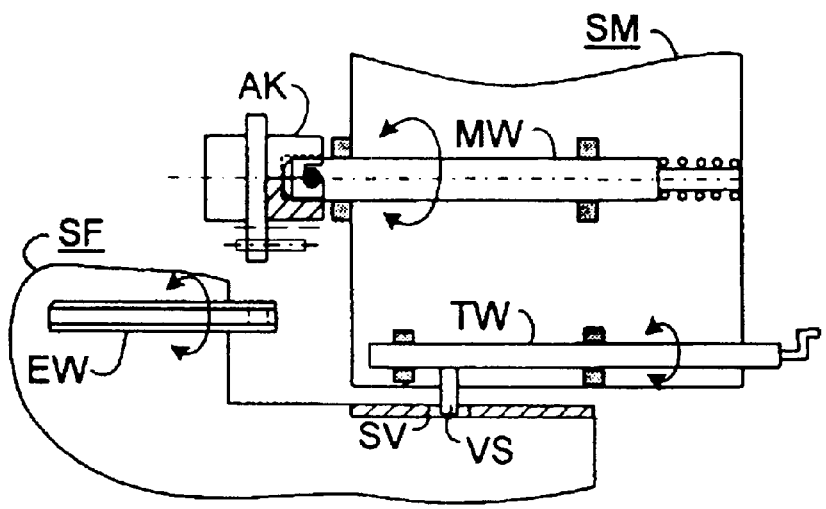
FIG. 2 shows the switching module with a force-fitting coupling with the switch panel.

FIG. 2 shows the force-fitting coupling between the movable switching module SM and the stationary switch panel SF. In this force-fitting coupling, the drive pin AS (FIG. 1) on the driver shaft MW of the switching module SM engages in the driver groove MN (FIG. 1) of the drive coupling AK in the switch panel SF. Thus, in this state, the grounding device shaft EW of the switch panel SF can be rotated in both arrow directions by the driver shaft MW of the switching module—as indicated. At the same time, the drive for the isolating contact, which is not shown, in the switch panel SF is rendered active by the disconnector shaft TW, whose interlock pin VS can engage in the interlock slot SV and which can thus lock the switching module SM to the switch panel SF.

Figure 3:
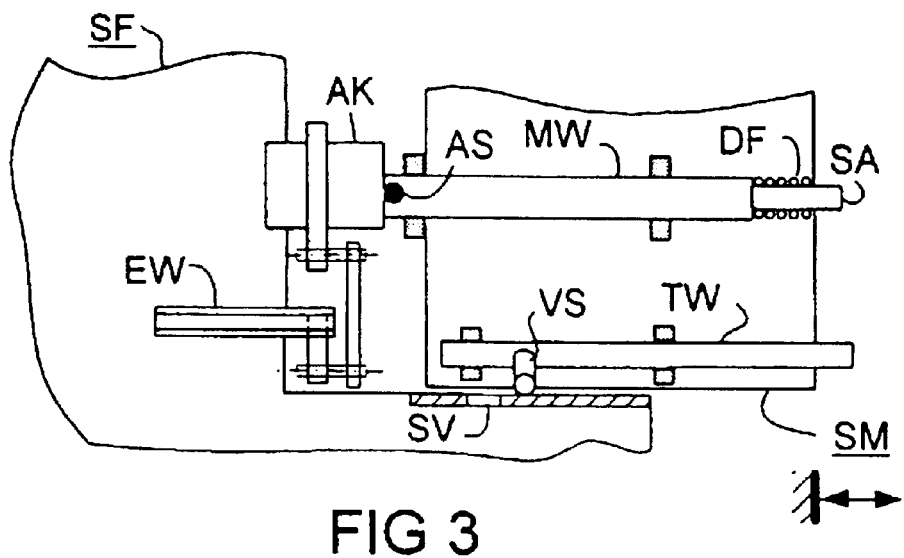
FIG. 3 shows the drive device in the state when it cannot be coupled.

FIG. 3 shows the drive device in the state when it cannot be coupled. The drive pin AS on the driver shaft MW cannot be engaged with the driver groove MN (FIG. 1) in the drive coupling AK. The disconnector shaft TW drive is inactive, and the isolating contact (which is not illustrated) within the switch panel SF thus cannot be selected. As indicated by the arrow symbology, the switching module SF can be moved in both arrow directions into the switch panel SF as far as the state which does not allow coupling.

This state is indicated visually since, as the drive pin AS moves into contact with the drive coupling AK, the module shaft MW is moved axially against the force of the compression spring DF, and the displaced part of the module shaft MW is moved beyond the contour of the switching module SM, as the pin indication SA.

In order to allow the drive for the grounding device shaft EW to be rendered effective once again within the switch panel SF, suitable measures must be taken within the switch panel SF itself, in order to allow the drive coupling AK in the switch panel SF to be moved once again into the engaged position with the module shaft MW as shown in FIGS. 1 and 2.

What is claimed is:

1. A drive device for a switching device, comprising:
    an operating shaft formed as a grounding device shaft in a stationary switch panel,
        the grounding device shaft connected by a drive mechanism, which transmits radial movements from a drive coupling to the grounding device shaft and is permanently rotationally fixed to the drive coupling and the grounding device shaft, and which accommodates the radial movements, of the switch panel; and
    a main shaft formed as a module shaft, which is mounted in a movable switching module such that it can rotate, with the longitudinal axes of the drive coupling and of the module shaft running such that they are superimposed, and wherein
        at a free end pointing toward the switch panel, the module shaft has a drive pin, which is arranged transversely with respect to a longitudinal axis, for engaging in the drive coupling,
        the switching module having a disconnector shaft, which is controlled to rotate or not rotate,
        the disconnector shaft provided in the free end region pointing toward the switch panel with an interlock pin arranged transversely with respect to a longitudinal axis and, when the drive pin on the module shaft is coupled to the drive coupling of the switch panel, engages in an interlock slot in the switch panel in order to lock the switching module to the switch panel.

2. The drive device as claimed in claim 1, further comprising:

a driver groove positioned in the drive coupling in such a manner that the drive pin on the module shaft can be engaged with the driver groove in a coupling state, in a free end region facing away from the switch panel, the module shaft is provided with a pin indication which, when not in the correctly coupled state, is configured to be moved axially against the force of a compression spring beyond the boundary contour of the switching module.

3. The drive device as claimed in claim 1, wherein in the engagement region with the drive coupling, the module shaft is provided with a first centering chamfer, and in the engagement region with the module shaft, the drive coupling is equipped with a further centering chamfer.

4. The device of claim 1, wherein the device is for grounding switches for medium-voltage switchgear assemblies, having a main shaft of a switch disconnector and having an operating shaft, configured for connection to a coupling device, of a grounding switch, in which case the operating shaft can be operated manually, and the longitudinal axes of the main shaft and of the operating shaft run parallel to one another.

5. A drive device for a switching device, comprising:

an operating shaft formed as a grounding device shaft in a stationary switch panel, the grounding device shaft connected by a drive mechanism, which transmits radial movements, to a drive coupling, which accommodates the radial movements, of the switch panel;

a main shaft formed as a module shaft, which is mounted in a movable switching module such that it can rotate, with the longitudinal axes of the drive coupling and of the module shaft running such that they are superimposed, and wherein at a free end pointing toward the switch panel, the module shaft has a drive pin, which is arranged transversely with respect to a longitudinal axis, for engaging in the drive coupling, the switching module having a disconnector shaft, which is controlled to rotate, the disconnector shaft provided in the free end region pointing toward the switch panel with an interlock pin arranged transversely with respect to a longitudinal axis and, when the drive pin on the module shaft is coupled to the drive coupling of the switch panel, engages in an interlock slot in the switch panel in order to lock the switching module to the switch panel; and a driver groove positioned in the drive coupling in such a manner that the drive pin on the module shaft can be engaged with the driver groove in a coupling state, in a free end region facing away from the switch panel, the module shaft is provided with a pin indication which, when not in the correctly coupled state, is configured to be moved axially against the force of a compression spring beyond the boundary contour of the switching module.

* * * * *